H. G. AHRWEILER.
RESILIENT SHACKLE.
APPLICATION FILED MAR. 13, 1912.
1,050,508.
Patented Jan. 14, 1913.
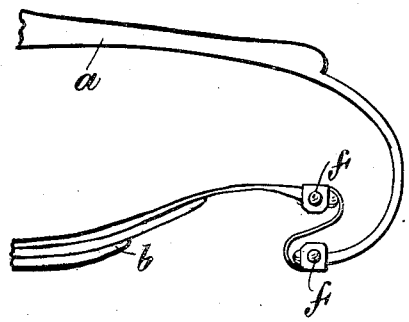
Fig.1.
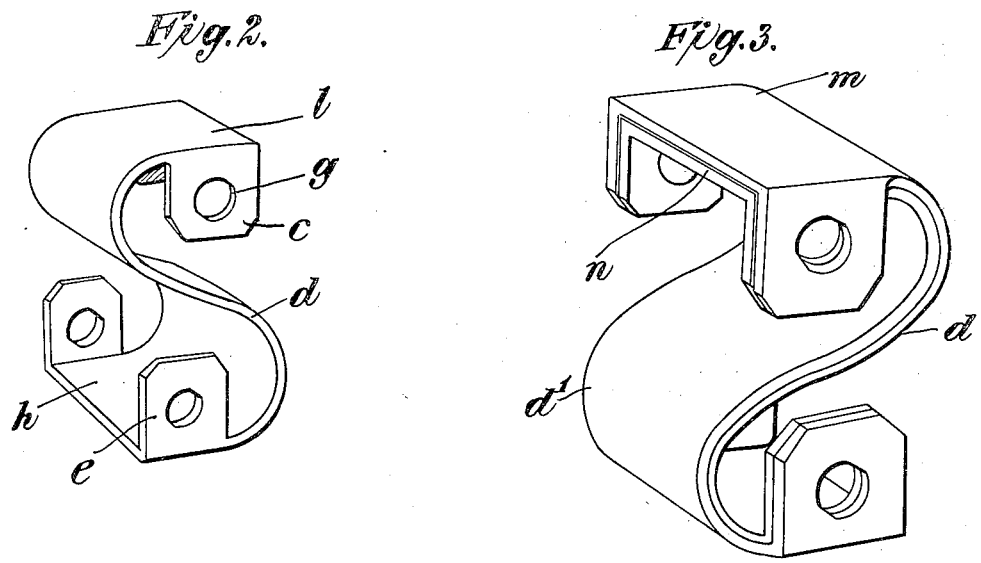
WITNESSES:
INVENTOR
Henry G. Ahrweiler
BY
Emery Booth Janney & Varney
his ATTORNEYS

UNITED STATES PATENT OFFICE.

HENRY G. AHRWEILER, OF NEW YORK, N. Y.

RESILIENT SHACKLE.

1,050,508.　　　　Specification of Letters Patent.　　Patented Jan. 14, 1913.

Application filed March 13, 1912. Serial No. 683,422.

*To all whom it may concern:*

Be it known that I, HENRY G. AHRWEILER, a citizen of the United States, and a resident of the borough of the Bronx of the city of New York, county and State of New York, have invented an Improvement in Resilient Shackles, of which the following description, in connection with the accompanying drawings, is a specification, like letters on the drawings representing like parts.

The object of the present invention is to provide a simple and efficient supplementary spring or shock absorber for use on vehicles, particularly those of the motor driven type. The laminated spring heretofore used generally on vehicles has been found to be inadequate when applied to the automobile and many attempts have been made to supplement the elasticity of such springs by various attachments. The difficulty with such devices, however, has been the great expense and inconvenience due to their complicated structure, involving a multiplicity of parts to be kept in repair.

The present invention contemplates a very simple and inexpensive device which may be made in one piece and be so applied to a vehicle between the running gear and the body thereof as to take the place of shackles and at the same time provide a means for absorbing the shocks incident to any inequalities in the road.

In the drawings, Figure 1 is a side view of the device as interposed between the members of a vehicle spring, Fig. 2 is a view in perspective, and, Fig. 3 is a similar view of the device when made up of two units.

One embodiment of my invention, as illustrated in Fig. 2 of the drawings, is seen to consist of an S-shaped spring portion $d$ having lugs $c$ and $e$ at its upper and lower ends respectively adjacent to bearing surfaces $l$ and $h$. As shown in Fig. 1, these lugs may be made to engage projecting members as $a$ and $b$ by means of shackle bolts $f$ passing through openings $g$ in the lugs and suitable corresponding openings in the projecting members, these members being fastened to the running gear or to the body of a vehicle which is not here shown. Generally these members are laminated springs; but either of them may be a rigid part of the frame to which it is attached or one may be such rigid part and the other a laminated spring. Whatever the nature of $a$ and $b$, the device practically constitutes an elastic shackle between the body and the running gear.

Where a vehicle is to be subjected to unusually severe strains, it may be desirable to increase the strength of the spring shackle which is accomplished by combining two of the members as shown in Fig. 3. In order that these units may be superimposed one upon another, it is necessary to make one end of each unit narrower than the opposite end. Fig. 3 shows the wide end $m$ of the spring $d$ placed in position over and around the narrow end $n$ of the spring $d^1$ while a similar but inverse relation exists between the respective springs at their opposite ends.

The illustrations of the device here given show the lugs extending in a direction toward each other from the ends of the spring. It is obvious, however, that in some instances it may be desirable to support the body of the vehicle upon the device while under compression. The arrangement necessary to make this adjustment could be brought about by providing the device with outwardly extending lugs in place of those shown.

Other changes and variations in arrangement can be made without, however, departing from the invention here disclosed.

I claim as my invention:—

1. A resilient shackle consisting of S-shaped members having lugs on their opposite ends, one end of each member being narrower than the other end so that the members may be mutually superimposed.

2. A resilient shackle consisting of S-shaped members having lugs at their opposite ends, the adjacent ends of the said members being so related that one member may be superimposed upon the other.

3. The combination with the spring system of a vehicle, of an S-shaped spring having a pair of apertured lugs at each end and forming a flexible connection between two parts of said system, and a bolt passing through one pair of lugs to connect the spring to one part of the system and another bolt passing through the other pair of lugs to connect the spring to the other part of the said system.

In testimony whereof, I have signed my name to this specification, in the presence of two subscribing witnesses.

HENRY G. AHRWEILER.

Witnesses:
G. AHRWEILER, Jr.,
JOHN W. THOMPSON.